No. 747,566. PATENTED DEC. 22, 1903.
G. A. W. McNERNEY.
WINDOW CLEANER.
APPLICATION FILED FEB. 18, 1903.
NO MODEL.
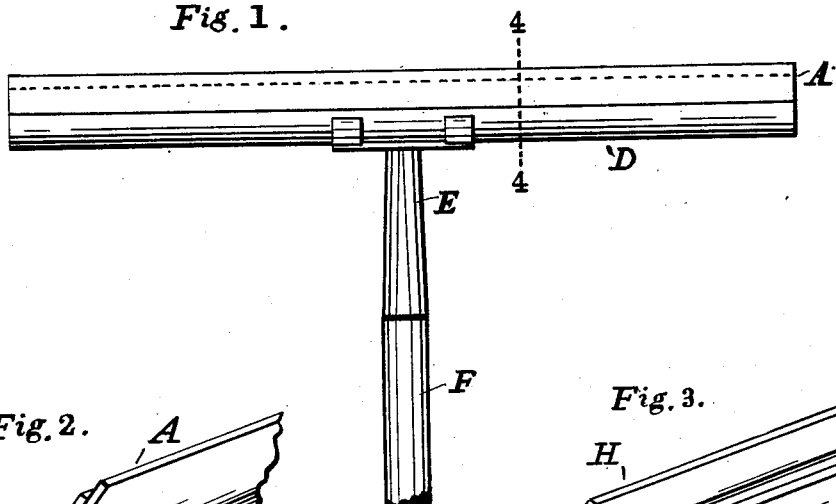
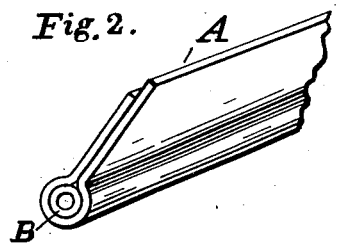
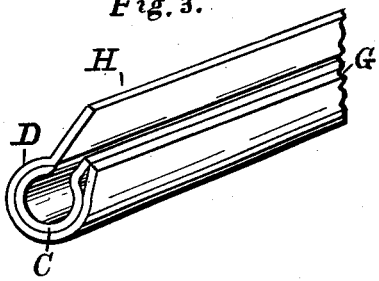
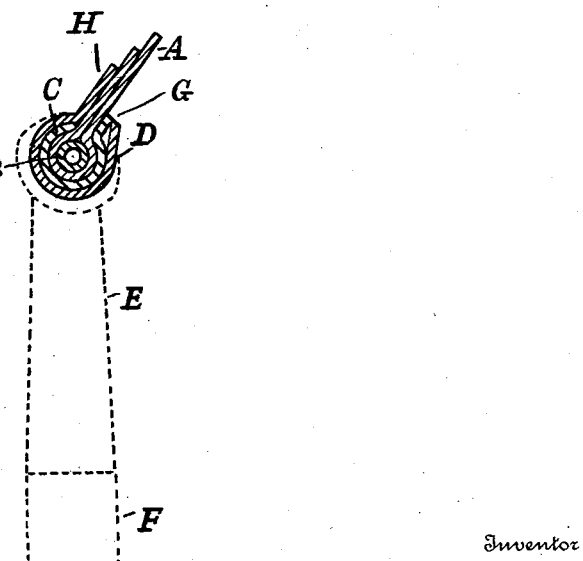

No. 747,566. Patented December 22, 1903.

UNITED STATES PATENT OFFICE.

GEORGE A. W. McNERNEY, OF ROCHESTER, NEW YORK.

WINDOW-CLEANER.

SPECIFICATION forming part of Letters Patent No. 747,566, dated December 22, 1903.

Application filed February 18, 1903. Serial No. 143,960. (No model.)

*To all whom it may concern:*

Be it known that I, GEORGE A. W. MCNERNEY, a citizen of the United States, residing at Rochester, in the county of Monroe, in the State of New York, have invented an Improvement in Window-Cleaners, of which the following is a specification, reference being had to the accompanying drawings.

My invention relates to certain improvements in window-cleaners.

The objects of my improvements are, first, to provide a window-cleaner which is simple and cheap, and, second, to enable the user to readily remove and replace the rubber portion when it becomes worn.

My improvements are fully described and illustrated in the following specification and the accompanying drawings, the novel features thereof being specified in the claim annexed to the said specification.

In the accompanying drawings, Figure 1 is a side elevation. Fig. 2 is a perspective of the rubber and the inner tube. Fig. 3 is a perspective of the socket-piece and the tubular clamp. Fig. 4 is a section on the line 4 4, Fig. 1.

A flat strip of rubber A is bent around a piece of rubber tubing B, as shown in Fig. 2. It is then pulled into the socket-piece C, as shown in Fig. 4, and the tube C is then slid into the outer or clamp tube D, the tube D having a lip or extension G, so shaped as to press on the tube C, as shown in Figs. 3 and 4, thus holding the rubber portions A and B firmly in place. A suitable tube-holder E is provided, attached to which is the handle F, as shown in Figs. 1 and 4.

The object of the tube B is to keep the rubber A from pulling out from the socket-piece C.

The socket-piece C is made of such size that the rubber A and the tube B slide easily into it; but when the socket-piece is slid into the clamp-tube D it is sprung or clamped by the lip or extension G, Fig. 4, holding the rubber firmly in place, but leaving it readily removable.

One edge of the clamp-tube D is made long, as shown at H in Fig. 4, so as to provide a backing or support for the rubber A.

The strib of rubber A and the tube B are of such size and shape as to be readily obtainable should age or wear make their replacement necessary.

The elasticity of the inner rubber tube B serves to secure the rubber sheet in place with sufficient friction against the extension of the socket-piece C, thereby preserving the sheet from being drawn out of the holder by the cleaning operation.

I claim—

In a window-cleaner, the combination with the longitudinally-slotted tubular holder, having projecting lips along the edges of the slot, of the inner elastic tube, the rubber sheet folded about the tube and having its ends projecting through the slot beyond the lip, and the slotted tubular socket-piece having a projecting lip, as and for the purposes set forth.

GEORGE A. W. McNERNEY.

Witnesses:
H. R. SELDEN,
G. B. SELDEN.